July 2, 1946.  B. D. FELD  2,403,204
HYDRAULIC SCALE
Filed Dec. 9, 1943  2 Sheets-Sheet 1
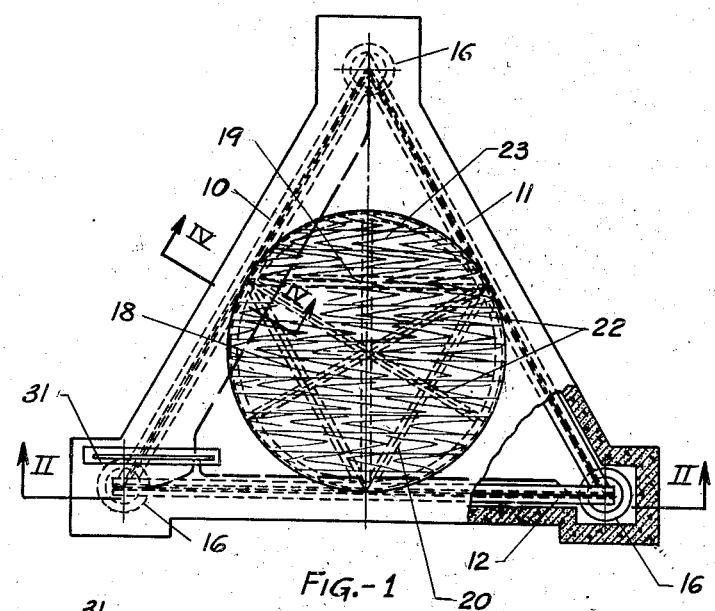
FIG.-1
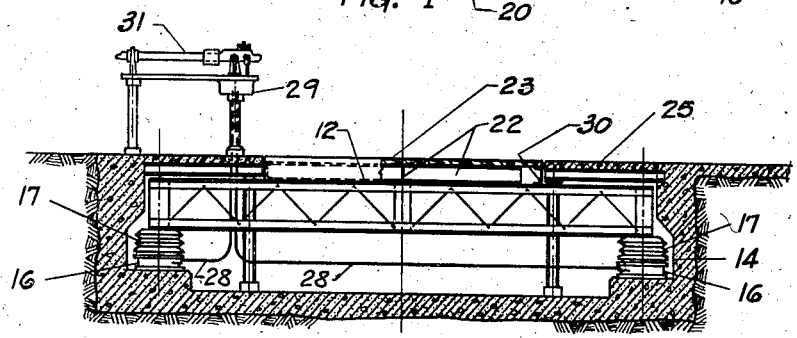
FIG.-2
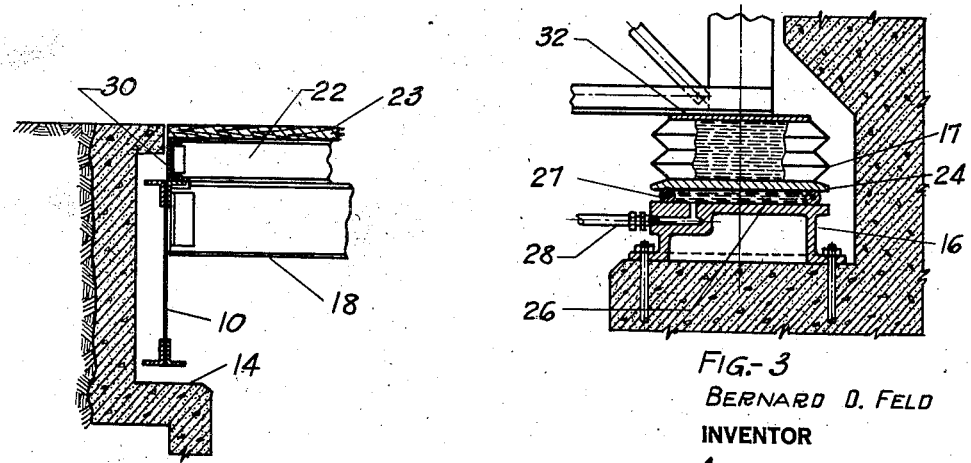
FIG.-4
FIG.-3
BERNARD D. FELD
INVENTOR
BY *Henry L. Jennings*
ATTORNEY

BERNARD D. FELD
INVENTOR

Patented July 2, 1946

2,403,204

UNITED STATES PATENT OFFICE 2,403,204

HYDRAULIC SCALE

Bernard D. Feld, Birmingham, Ala.

Application December 9, 1943, Serial No. 513,585

5 Claims. (Cl. 265—47)

This invention relates to hydraulic scales and has for an object the provision of apparatus of the character designated which shall embody a plurality of pressure producing units, together with improved means for imposing the load to be weighed on said units.

A more specific object of my invention is to provide a hydraulic scale including a platform and a plurality of pressure producing units, in which the pressure producing units are spaced outwardly from the platform a substantial distance, and the weight is transmitted to the pressure producing units through liquid filled bellows.

In the design and operation of hydraulic scales difficulties have been encountered in obtaining uniform weighing results with the same apparatus over a wide range, especially where heavy loads are to be weighed. It has been the practice heretofore to provide a rigid platform and to impose the weight of the platform and load to be weighed on the pressure producing units, or capsules, arranged at the four corners of the platform. When extra heavy loads are applied inequalities in the pressure produced per unit of weight appear, especially where the load is not centered on the platform, which inequalities impair the accuracy of the result. I have observed that these inequalities in pressure produced are due in large measure to unequal loads on the separate pressure producing units, and unequal application of the load over the area of the individual units on which load is imposed. These difficulties are overcome in accordance with my invention (a) by spacing the pressure producing units a substantial distance from the platform, that is a distance equal to or greater than the longest dimension of the platform and (b) by transmitting the weight to the pressure producing units through a liquid filled bellows. Preferably there are employed only three pressure producing units equally spaced about the platform whereby the weight on the pressure producing units is always proportionately distributed. In this manner I provide for an even application of the load on each pressure producing unit, and for a more nearly equal distribution of the load to the several units.

Apparatus embodying features of my invention is illustrated in the accompanying drawings forming a part of this application, in which Fig. 1 is a plan view of a hydraulic scale constructed in accordance with my invention and embodying three pressure producing units;

Fig. 2 is a sectional view taken along the line II—II of Fig. 1;

Fig. 3 is a detail sectional view showing the application of the load to one of the pressure producing units and the liquid filled bellows associated therewith;

Fig. 4 is a detail sectional view taken along the line IV—IV of Fig. 1;

Figure 5:
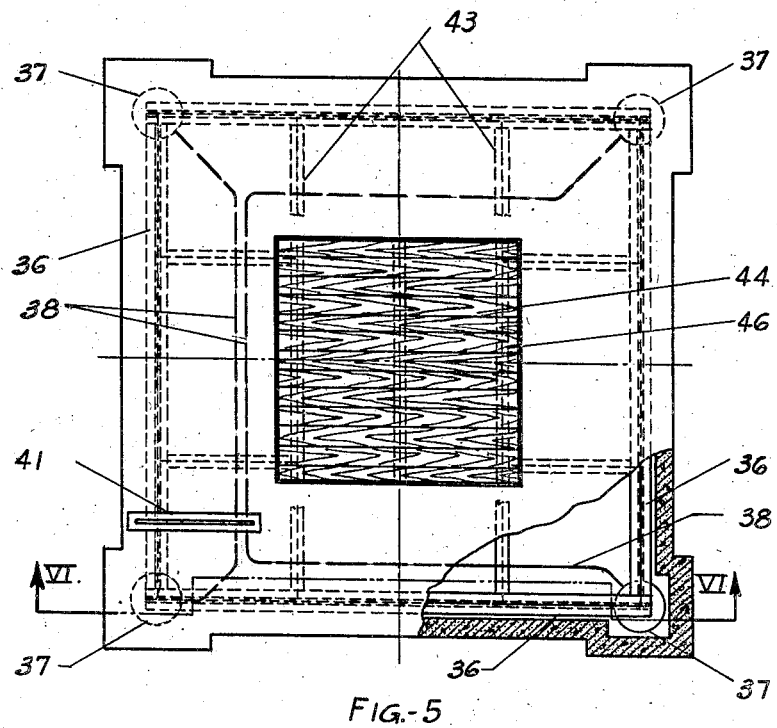
Fig. 5 is a plan view of a scale embodying four pressure producing units.

Referring to the drawings I show in Fig. 1 a scale embodying a triangular frame having three sides of equal length 10, 11 and 12 joined together at the corners. Preferably the sides are constructed in the form of trusses as shown at 12 in Fig. 2 and the frame is disposed in a suitable pit 14. At each of the corners of the frame is a hydraulic pressure producing element 16 upon which the weight of the frame rests. Interposed between each of the units 16 and the frame is a cushion 17 formed from a metal bellows filled with a suitable liquid as shown in Fig. 3.

The sides 10, 11 and 12 of the frame are joined to their adjacent sides of the triangular frame by intersecting beams 18, 19 and 20 and mounted on the intersecting beams is a platform 23, the platform being preferably circular in form and disposed centrally of the scale frame. The platform is supported by I beams 22 which rest on the beams 18, 19 and 20. See Fig. 4. Also, a circular channel frame 30 extends around the platform and is joined to the I beams. The diameter of the platform 23 is approximately half, or less than half, the length of one of the sides of the triangular frame. Overhanging the frame and giving approach to the platform is a suitable stationary platform 25, as seen in Fig. 2.

As is well understood, the pressure producing units 16 contain liquid and develop a pressure proportional to the load imposed upon them. While any suitable pressure producing unit may be employed, I prefer one such as is disclosed and claimed in my copending application, Serial No. 512,895, filed Dec. 4, 1943. Such a unit comprises an upper plate 24 and a lower plate 26 having circular grooves, in their opposed faces, and a reinforced ring gasket 27 seated in the grooves with a suitable liquid enclosed by the plates and the gasket, in the space between the plates. A pipe 28 is connected to each of the pressure producing units and communicates with the space between the plates. The several pipes 28 lead to a suitable conversion unit 29, such, for example, as that disclosed in the patent to R. S. Bohannon No. 2,307,196, dated January 5, 1943, in which the pressure created is transmitted to a scale beam 31 to indicate the weight imposed on the units. Inasmuch as this conversion of pressure to a scale reading forms no part of my invention, it is not described in detail, and reference is made to the before mentioned patent for details thereof.

In the operation of my improved scale, the weight is transmitted from the frame to the liquid filled bellows 17 through an upper plate 32 resting on the bellows. The lower end of the bellows rests on the upper plate 24 of the pressure producing unit 16. The bellows being flexible axially and filled with a liquid and sealed, the weight of the scale is transmitted equally over the entire area of the upper plate and there is no concentrated pressure over a small area as is the case where a knife edge or ball joint is interposed between the frame and the pressure producing unit. Furthermore, the frame being triangular in form and symmetrical in construction, rests equally on the pressure producing units 16. The platform 23 being centrally disposed on the frame, and having its longest dimension approximately one half the length of one side of the frame, any load placed upon it is transmitted substantially equally to the three pressure producing units 16. By this means, it will be seen that any load imposed upon the scale frame will be reflected substantially equally by pressure produced in the three pressure producing units and a more accurate conversion of the pressure in the units to a scale beam reading can be accomplished.

Figure 6:
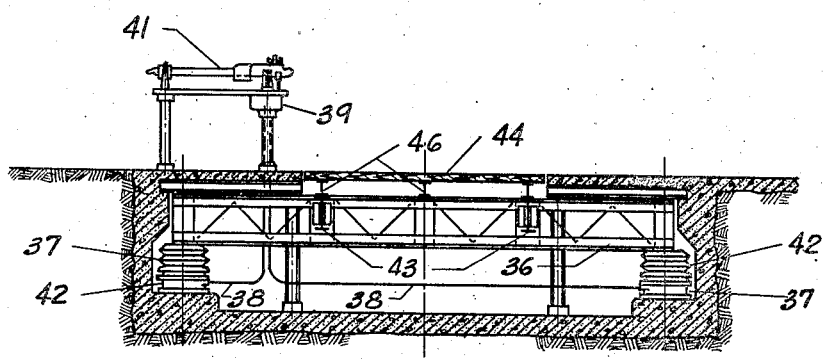
Fig. 6 is a sectional view taken along the line VI—VI of Fig. 5.

In Figs. 5 and 6 I show a modified form of my invention in which a rectangular frame 36 is employed with four pressure producing units 37 supporting the frame at the four corners thereof and connected through pipes 38 to a conversion unit 39 which transforms the pressure to a mechanical movement through the scale beam 41. A liquid filled bellows 42 is interposed between the frame and each of the pressure producing units 37. The rectangular frame 36 is made up of trusses as shown in Fig. 6 which are suitably joined together at the corners. Transverse frame members 43 extend across the frame and join the opposed sides. Supported on the frame members 43 is a rectangular platform 44 which rests on I beams 46 which are supported by the transverse frame members 43. The platform 44 is centrally disposed on the frame 36 and, as in the previous embodiment of my invention, has its longest dimension approximately one half the length of one of the sides of the scale frame. The operation of the embodiment of my invention just described is substantially the same as that disclosed in Figs. 1 and 2 in that the weight of the frame is transmitted equally to the pressure producing units and the central disposition of the platform will be transmitted to the pressure producing units substantially equally.

While I have shown my invention in but two forms, it will be obvious to those skilled in the art that it is not so limited, but is susceptible of various other changes and modifications, without departing from the spirit thereof, and I desire, therefore that only such limitations shall be placed thereupon as are specifically set forth in the appended claims.

What I claim is:

1. In a hydraulic scale, a polyhedral frame, a platform supported by the frame centrally thereof and having its longest dimension substantially shorter than any side of the frame, a plurality of hydraulic pressure producing units disposed beneath the corners of the frame, and a liquid filled bellows interposed between the frame and each of the pressure producing units.

2. In a hydraulic scale, a polyhedral frame, a weighbridge supported by the frame centrally thereof, the longest dimension of which is less than one half the length of one of the sides of the frame, hydraulic pressure producing units supporting the frame and disposed at the corners of the frame and a liquid filled bellows between the frame and each of the pressure producing units.

3. In a hydraulic scale, an equilateral triangular frame, a platform supported by the frame centrally thereof a substantial distance from the corners of the frame, a hydraulic pressure producing unit disposed to support the frame at each of the corners thereof, and a liquid containing metal bellows for transmitting the weight of the frame to each of the pressure producing units.

4. In a hydraulic scale, a triangular frame, a platform supported by the frame centrally thereof, the longest dimension of which is approximately half the length of the frame, a hydraulic pressure producing unit for supporting each of the corners of the frame, and a liquid containing metal bellows for transmitting the weight of the frame to each of the said units.

5. In a hydraulic scale including a frame, a weighbridge supported by the frame centrally thereof, a plurality of hydraulic pressure producing units supporting the frame, and a liquid filled bellows interposed between the frame and each of the pressure producing units.

BERNARD D. FELD.